United States Patent [19]
Chamberlain

[11] Patent Number: 5,628,655
[45] Date of Patent: May 13, 1997

[54] FIELD REPLACEABLE CONNECTOR FOR SEISMIC INSTRUMENT

[76] Inventor: Donald G. Chamberlain, Site 36, Box 43, RR 4, Calgary, Alberta, Canada, T2M 4L4

[21] Appl. No.: 480,277

[22] Filed: Jun. 7, 1995

[51] Int. Cl.[6] .................................................. H01R 11/00
[52] U.S. Cl. .................... 439/651; 439/292; 439/624; 439/638
[58] Field of Search ..................... 439/287, 288, 439/289, 292, 529, 530, 534, 624, 638, 651

[56] References Cited

U.S. PATENT DOCUMENTS

| | | | |
|---|---|---|---|
| 2,652,546 | 9/1953 | Christner | 439/651 |
| 3,548,363 | 12/1970 | Flanigan | 439/638 |
| 3,626,354 | 12/1971 | Banner | 439/651 |
| 3,671,918 | 6/1972 | Mitchell | 439/651 |
| 3,923,121 | 12/1975 | Kruppenbach et al. | 439/624 |
| 4,364,624 | 12/1982 | Williams | 439/651 |
| 4,609,247 | 9/1986 | Annoot | 439/292 |

FOREIGN PATENT DOCUMENTS

| | | | |
|---|---|---|---|
| 3941398 | 7/1990 | Germany | 439/638 |
| 396993 | 8/1933 | United Kingdom | 439/638 |

*Primary Examiner*—Gary E. Elkins
*Attorney, Agent, or Firm*—John Russell Uren

[57] ABSTRACT

A removable connector operable to be inserted between a main cable carrying seismic information and a box connector of a remote acquisition module. The removable connector is adapted to isolate any forces arising in the main cable from the box connector of the module. The removable connector is removably secured to the remote acquisition module by a pin which extends through the housing of the removable connector and a bracket mounted to the module. The pin transfers the cable forces to the remote acquisition module and substantially isolates the box connector from such forces thereby extending the life of the box connector.

4 Claims, 4 Drawing Sheets

FIELD REPLACEABLE CONNECTOR FOR SEISMIC INSTRUMENT

INTRODUCTION

This invention relates to a field replaceable connector and, more particularly, to a field replaceable connector for a seismic instrument.

BACKGROUND OF THE INVENTION

In exploration for oil and gas, the use of seismic instruments is well known. Typically, a large number of transducers or geophones are positioned at desired locations on the ground. Geophone cables run from each of the geophones and join a central or main cable which runs to a remote acquisition module which is typically located a distance from the central data acquisition location which is conveniently a vehicle. There may be a large number of remote acquisition modules and geophones. After positioning the geophones, an explosive charge is set off. The signals from the formation of interest are transmitted from the individual geophones to the remote acquisition module and, thence, to the vehicle where the received data is compiled and processed as desired.

The main cable containing the individual geophone cables is connected directly to the remote acquisition module. Typically, the connector on the remote acquisition module is a bayonet type connector with a plurality of male pins extending therefrom. It mates with the female connector on the end of the main cable. There are, however, disadvantages with the present connection system.

There is considerable abuse of the main cable, the geophones and the remote acquisition modules in the field as can be readily understood by noting the field conditions under which such exploration activities may be taking place. The main cable can be twisted or driven over by vehicles. The remote acquisition module can likewise be abused. Similarly, the connector can simply wear out after a certain number of connection and disconnection cycles have occurred. The result of this abuse and aging is a deterioration of the connection between the main cables and the remote acquisition modules which affects the integrity of data transmission between the geophones and the remote acquisition module. To prevent problems in data transmission, the connection must be replaced.

However, to replace the connector between the remote acquisition module and the cable, it is necessary to open the module. The modules are well sealed to prevent damage to the electronics within. By opening the module, the electronic components are exposed and the ambient conditions under which such exposure takes place can cause unnecessary damage to the electronics which, again, affects the integrity of data acquisition. Test equipment to test the integrity of the module after the module has been opened may likewise not be available in the field. Alternatively, the module can be removed from operation and shipped to a remote location where connection replacement can take place under laboratory conditions and where testing equipment is available. Such removal, however, creates downtime and shipping costs. Acquisition modules are expensive and it is not desirable to have such downtime if it can be reasonably avoided.

SUMMARY OF THE INVENTION

According to one aspect of the invention, there is provided a removable connector operable to be inserted between the end of a cable connector of a main cable carrying data from a remotely located transducer and a box connector located on a remote acquisition module, said removable connector comprising first and second sub-connectors, said first sub-connector being operable to be connected to said cable connector of said main cable and said second sub-connector being operable to be connected to said box connector of said remote acquisition module, one of said first and second sub-connectors being a male connector and the other of said first and second sub-connectors being a female connector.

BRIEF DESCRIPTION OF THE SEVERAL VIEWS OF THE DRAWINGS

A specific embodiment of the invention will now be described, by way of example only, with the use of drawings in which:

FIG. 1 is a diagrammatic view of a typical seismic system used to obtain field data in exploration operations;

FIG. 2 is a diagrammatic side view of a main cable connected to a remote acquisition module according to the prior art;

FIG. 3 is a diagrammatic partial side view of a main cable connected to a remote acquisition module utilising one removable connectors according to the present invention;

FIG. 4 is a plan view of the remote acquisition module and one removable connector of FIG. 3;

FIG. 5 is a further side view of the remote acquisition module and removable connector of FIG. 4 ninety (90) degrees removed without a main cable attached thereto and further illustrating the protection cage according to a further aspect of the invention; and FIGS. 6A–6E are diagrammatic views of the removable connector from various locations according to the present invention.

DESCRIPTION OF SPECIFIC EMBODIMENT

Referring now to the drawings, a typical seismic data acquisition system is illustrated generally at 10 in FIG. 1. It comprises a data acquisition and processing vehicle 11. A plurality of remote acquisition modules 12 are located remotely from vehicle 11 and connected thereto by main cables 13 which extend between the respective remote acquisition modules 12 and the data acquisition vehicle 11. A plurality of transducers or geophones 14 are located remotely from the modules 12 and are generally placed in the ground in order to transmit the signals generated after a seismic explosion occurs in order to determine the geology of the site of interest. Individual transducer cables 20 extend from the geophones 14 to main cables 13 which are connected to the ports 22 on the remote acquisition modules 12.

Reference is now made to FIG. 2 wherein the main cables 13 are illustrated as being connected to the data acquisition ports 22 of the remote acquisition module 12 according to the prior art. Each of the main cables 13 has a female type main cable connector 23 attached thereto. A male box connector 24 is mounted on the remote acquisition module 12. The main cable and box connectors 23, 24, respectively, are of the bayonet type; that is, the main cable and box connectors 23, 24, respectively, are joined and a collar 30 with a cammed inner surface containing complementary pins on the box connector 24 is rotated thereby to tighten the connection.

As will be seen from FIG. 2, any force exerted on the main cables 13 by twisting or otherwise, will be disadvantageously transmitted to remote acquisition module 12 through the connection between the box connector 24 and the main cable connector 23 thereby causing a deterioration of the integrity of such connection.

Figure 1:
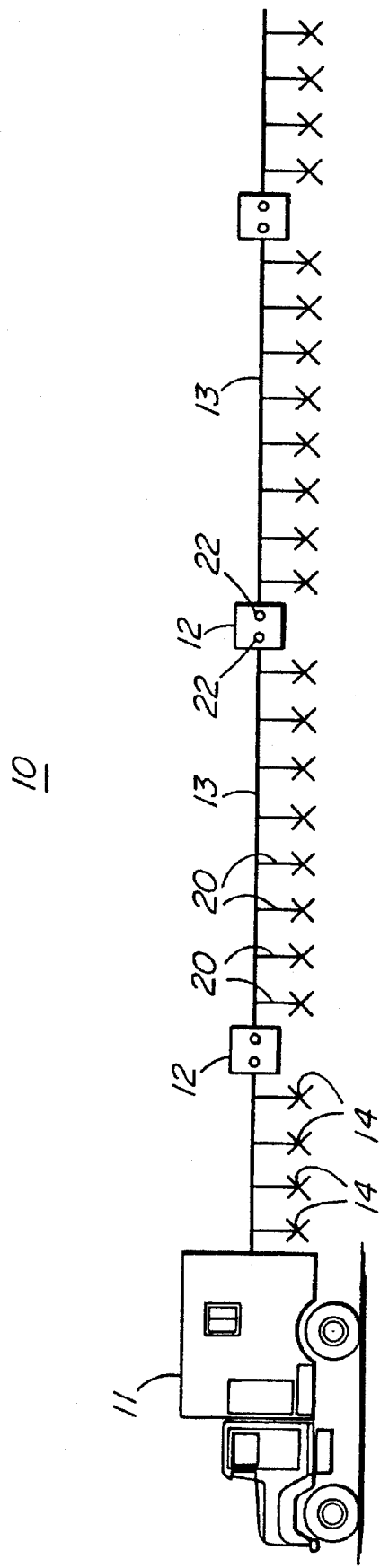
Figure 2:
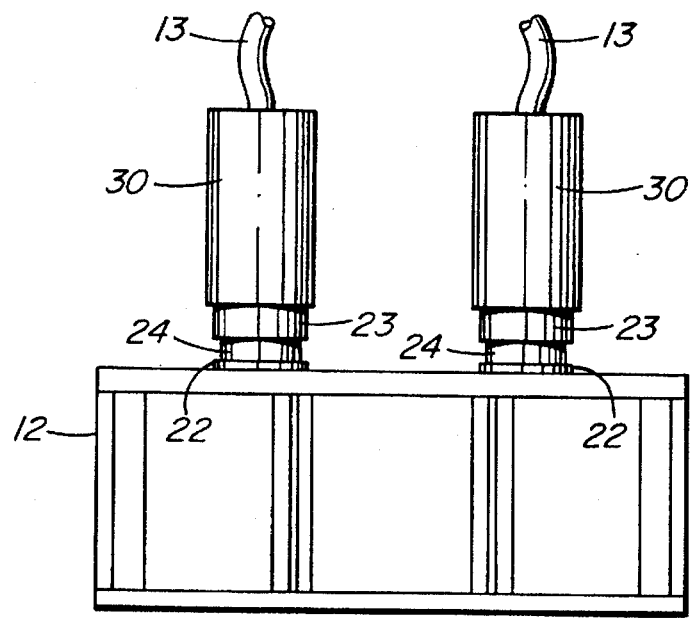
Figure 3:
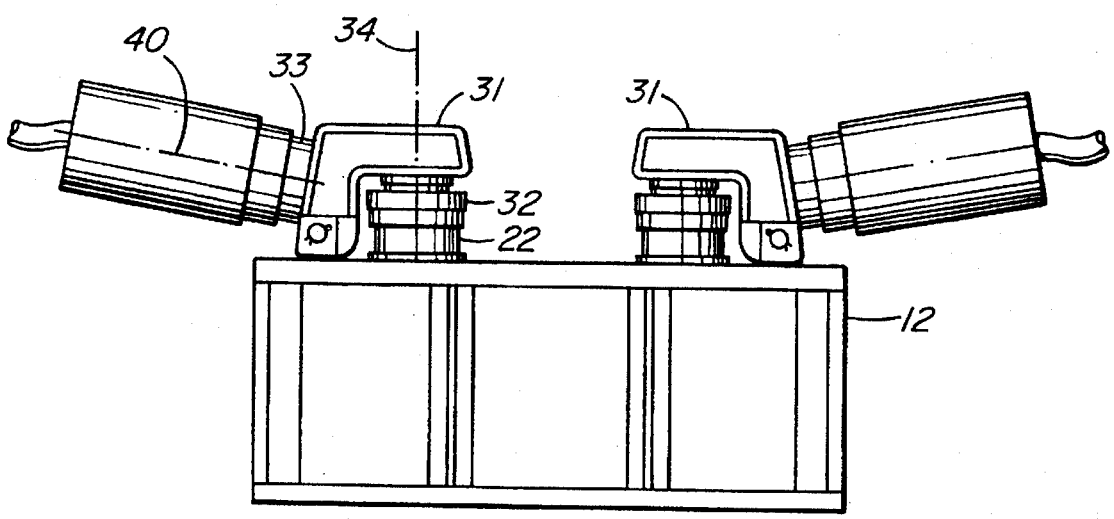

Reference is now made to the FIG. 3 wherein removable connectors 31 according to the present invention are operably connected to each of the ports 22 on the remote acquisition module 12. Only one such connection will be discussed hereafter.

The removable connector 31 has a female sub-connector 32 at one end and a male sub-connector 33 at the opposite end, the axis 34 of the female sub-connector 32 being approximately 90 degrees removed from the axis 40 of the male sub-connector 33. The pins 41 of the male sub-connector 33 (FIG. 6) are connected to the female receiving holes 42 by wires 43. A housing conveniently made from a strong molded plastic material, encapsulates the wires 43 and also includes the male and female sub-connectors 33, 32, respectively, as a single integral member.

Housing 44 also includes a hole 50 extending therethrough. Hole 50 is intended to be axial with a complementary hole 51 in a bracket 52 (FIG. 4) such that a locking pin 53 is insertable though both holes as will be described in more detail hereafter.

Figure 4:
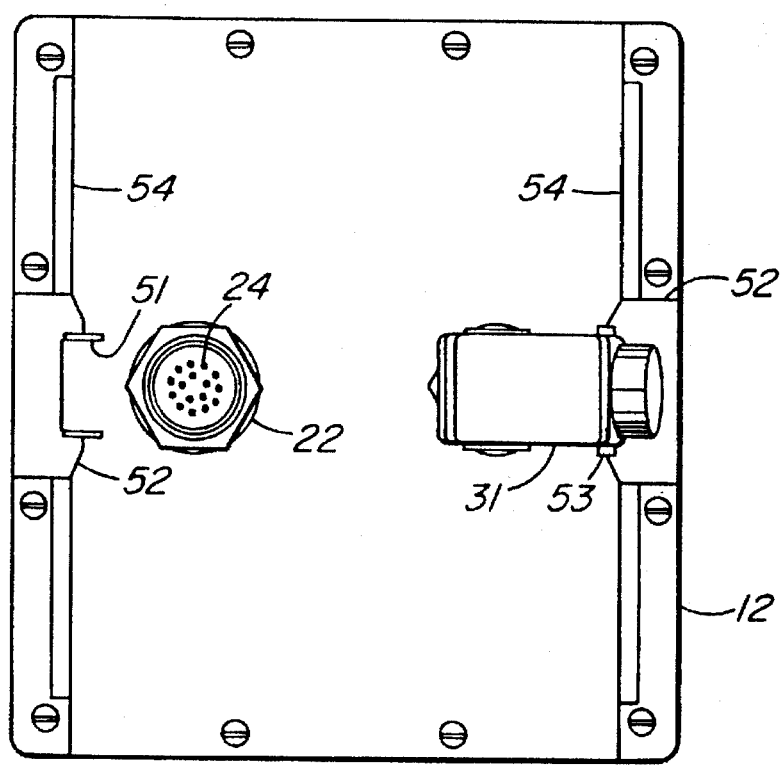
Figure 5:
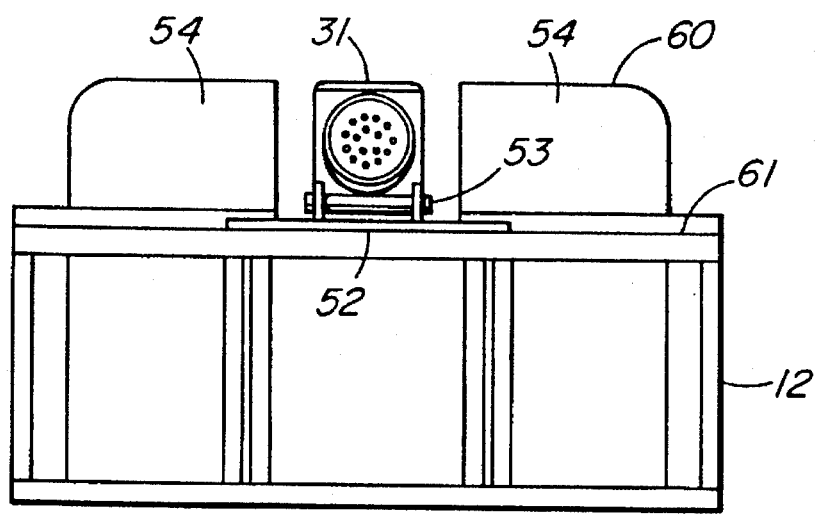
Figure 6A:
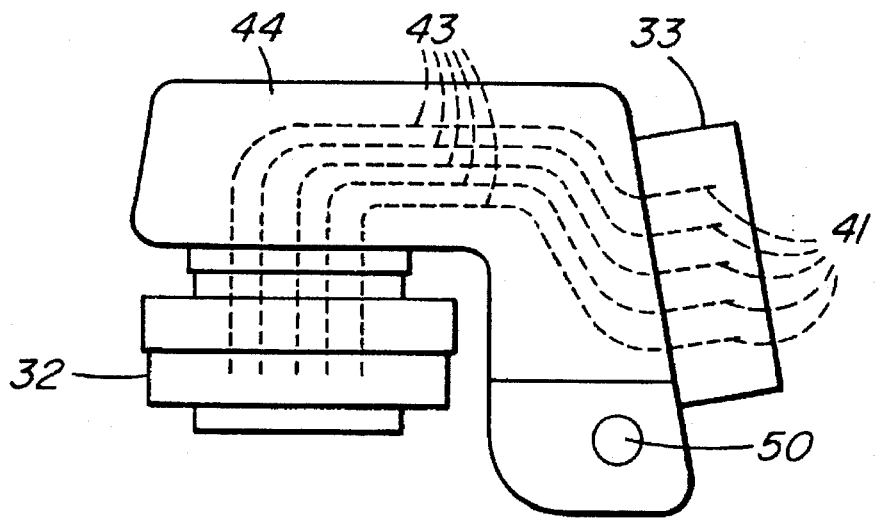
Figure 6B:
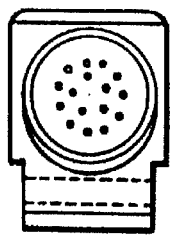
Figure 6C:
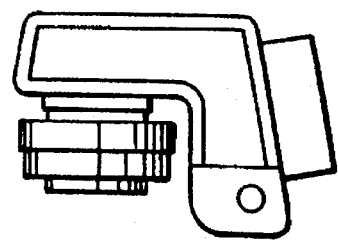
Figure 6D:
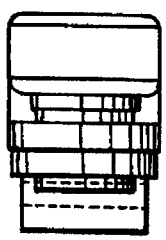
Figure 6E:
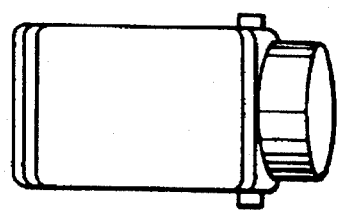

A protection barrier 54 is mounted on the upper surface at each end of the remote acquisition module 12 (FIGS. 4 and 5). The protection barrier 54 is rigidly connected to the remote acquisition module 12 and extends upwardly a distance sufficient to clear the distance of any of the components connected to the remote acquisition module 12. Specifically, the distant end 60 of the protection barrier 54 is located a distance from the upper surface 61 of the remote acquisition module 12 such that the top surface 62 of the removable connector 31 is cleared. Thus, if the remote acquisition module 12 is upended, driven over or the like, the removable connectors 31 as well as the box connectors 24 and other components on the top of the remote acquisition module 12 are not damaged.

OPERATION

In operation, it will be assumed that the remote acquisition module 12 is in a condition where the box connectors 24 of the ports 22 are not connected to any of the cables; that is, no data is being generated and no data is being collected such as is illustrated at the left hand port 22 of FIG. 4.

An operator will then position a removable connector 31 such that the hole 50 in housing 44 is generally vertically aligned with the hole 51 of bracket 52. The female connector 32 will be inserted into the box connector 24 and collar 30 will be rotated until the connection is appropriately tightened. In such a tightened position, the hole 50 in housing 44 and the hole 51 in bracket 52 are axially aligned and locking pin 53 is inserted through the two holes and secured by a cotter pin (not shown) on each side of bracket 52. The fit of the locking pin 53 through the holes 50, 51 is intended to be comfortably tight thereby to remove most play between the removable connector 31 and bracket 52.

Thereafter, the main cables 13 are connected to male sub-connector 33 as has been previously described in association with the connection of the female connector 23 to the box connector 24. The unit is then ready for operation.

It will be particularly noted that if an external force is applied to main cable 13, such force will be transmitted to the removable connector 31 and thence to the remote acquisition module 12 primarily through the locking pin 53 and bracket 52 and not through the box connector 24 thereby preserving the condition of box connector 24 and reducing or eliminating down time since, in the event the male sub-connector 33 is damaged, the removable connector 31 may simply be replaced without removing the remote acquisition module 12 from the field and without requiring the opening of the remote acquisition module.

While the axes of the respective male and female subconnectors 33, 32, respectively, have been described as being approximately 90 degrees removed, it is contemplated that many other angular separations are possible and, indeed, the two axes may well be aligned such as would be the case if it was intended that the axis of the cable connectors be identical to the axis of the box connectors 24.

While a specific embodiment of the invention has been described, such description should be considered to be illustrative of the invention only and not as limiting its scope as defined in accordance with the accompanying claims.

What is claimed is:

1. A removable connector operable to be inserted between the end of a cable connector of a main cable carrying data from a remotely located transducer and a box connector located on a remote acquisition module, said removable connector comprising first and second sub-connectors, said first sub-connector being operable to be connected to said cable connector of said main cable and said second sub-connector being operable to be connected to said box connector of said remote acquisition module, one of said first and second sub-connectors being a male connector and the other of said first and second sub-connectors being a female connector, and means for securing said connector to said remote acquisition module, said securing means being a hole in said connector and means extending from said hole to said remote acquisition module thereby to maintain said connector substantially fixed relative to said module.

2. A removable connector as in claim 1 wherein said first and second sub-connectors each have respective axes, said axis of said first sub-connector having a first angular orientation, said axis of said second sub-connector being at a second angular orientation, said angular orientation of said axis of said first sub-connector being different from said angular orientation of said axis of said second sub-connector.

3. A removable connector as in claim 2 wherein said securing means further includes a bracket connected to said module and a pin, said bracket having holes complementary to said hole in said connector, said pin being operable to extend through said holes in said bracket and said hole in said connector.

4. A removable connector as in claim 3 and further comprising a protection barrier operable to be mounted on said module, said module having a first upper surface, said connector having a second upper surface, said protection barrier extending upwardly from said upper surface of said module, a distance sufficient to clear said upper surface of said connector.

* * * * *